(12) United States Patent
Naiki et al.

(10) Patent No.: US 11,356,264 B2
(45) Date of Patent: Jun. 7, 2022

(54) AUTHENTICATION SYSTEM

(71) Applicant: KABUSHIKI KAISHA TOKAI RIKA DENKI SEISAKUSHO, Aichi (JP)

(72) Inventors: Kazuki Naiki, Aichi (JP); Hiroaki Iwashita, Aichi (JP); Kenichi Koga, Aichi (JP); Yoshiyuki Oya, Aichi (JP); Yoshiki Oishi, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 77 days.

(21) Appl. No.: 16/769,826

(22) PCT Filed: Feb. 28, 2019

(86) PCT No.: PCT/JP2019/007778
§ 371 (c)(1),
(2) Date: Jun. 4, 2020

(87) PCT Pub. No.: WO2019/181412
PCT Pub. Date: Sep. 26, 2019

(65) Prior Publication Data
US 2020/0374122 A1   Nov. 26, 2020

(30) Foreign Application Priority Data
Mar. 22, 2018 (JP) .............................. JP2018-054697

(51) Int. Cl.
*H04L 29/06* (2006.01)
*H04L 9/32* (2006.01)
*H04L 9/08* (2006.01)

(52) U.S. Cl.
CPC .......... *H04L 9/3226* (2013.01); *H04L 9/0861* (2013.01); *H04L 2209/80* (2013.01); *H04L 2209/84* (2013.01)

(58) Field of Classification Search
CPC .. H04L 9/3226; H04L 9/0861; H04L 2209/80
See application file for complete search history.

(56) References Cited

U.S. PATENT DOCUMENTS

2003/0226017 A1    12/2003  Palekar et al.
2005/0108533 A1*    5/2005  Ji ............................ H04L 63/08
                                                            713/171

(Continued)

FOREIGN PATENT DOCUMENTS

CN            1351789 A   *  5/2002   ......... H04L 63/0435
JP       2012-193499 A     10/2012

(Continued)

OTHER PUBLICATIONS

International Search Report, dated May 5, 2019 by the Japan Patent Office (JPO), in International Application No. PCT/JP2019/007778.

*Primary Examiner* — Shawnchoy Rahman
(74) *Attorney, Agent, or Firm* — Greenblum & Bernstein, P.L.C.

(57) ABSTRACT

An authentication system includes an authentication unit that performs an authentication process between a first communication device and a second communication device when the first communication device and the second communication device communicate. The authentication unit performs the authentication process by transmitting authentication information from one of the first communication device and the second communication device to the other one, calculating the authentication information with an encryption code in each of the first communication device and the second communication device, and evaluating a calculation result. During a processing series in the authentication process, the authentication unit performs a first authentication based on part of the calculation result transmitted between the first and second communication device, (Continued)

and a second authentication based on another part of the calculation result transmitted between the first and second communication device.

9 Claims, 10 Drawing Sheets

(56) References Cited

U.S. PATENT DOCUMENTS

| | | | |
|---|---|---|---|
| 2007/0157027 A1 | 7/2007 | Palekar et al. | |
| 2008/0201199 A1* | 8/2008 | Armstrong | G06Q 30/0203 705/7.32 |
| 2009/0154703 A1* | 6/2009 | Price | H04L 9/0897 380/277 |
| 2012/0257749 A1* | 10/2012 | Gremaud | H04N 21/4623 380/210 |
| 2014/0372319 A1* | 12/2014 | Wolovitz | G06Q 20/3829 705/44 |
| 2017/0324717 A1* | 11/2017 | Kravitz | H04L 67/20 |

FOREIGN PATENT DOCUMENTS

| | | | | |
|---|---|---|---|---|
| JP | 2015-001935 A | 1/2015 | | |
| JP | 2016-038332 A | 3/2016 | | |
| WO | WO-2008051736 A2 * | 5/2008 | | G06F 21/554 |
| WO | WO-2011066381 A2 * | 6/2011 | | G06F 1/1694 |
| WO | 2017/131115 A1 | 8/2017 | | |

* cited by examiner

AUTHENTICATION SYSTEM

TECHNICAL FIELD

The present invention relates to an authentication system.

BACKGROUND ART

In a vehicle, a known example of an electronic key system controls the vehicle through wireless communication between an electronic key, which is carried by a user, and an on-board device, which is mounted on the vehicle. A smart verification system is known as an electronic key system in which an automatically responsive electronic key performs ID verification through wireless communication.

Patent Document 1 describes an example of an electronic key system in which one of an on-board device and an electronic key transmits authentication information to the other one of the on-board device and the electronic key. The other one of the on-board device and the electronic key performs a calculation with the authentication information using an encryption code. The calculation result is evaluated to authenticate both of the on-board device and the electronic key.

Patent Document 1: Japanese Laid-Open Patent Publication No. 2012-193499

SUMMARY OF THE INVENTION

With the type of electronic key described above, illegitimate actions may be performed using relays to accomplish ID verification without the user, who is carrying the authorized electronic key, knowing. Illegitimate actions using relays include an action that accomplishes ID verification in an illegitimate manner when, for example, the electronic key is located at a position remote from the vehicle through communication relayed by multiple relays between the on-board device and the electronic key. Thus, an ID verification may be accomplished without the user, who is carrying the authorized electronic key, being aware.

Further, a fake device that copies wireless communication and transmits a copied signal may be used to perform a faking action that fakes ID verification in an illegitimate manner. This may also result in accomplishment of ID verification in an illegitimate manner.

One object of the present disclosure is to provide an authentication system that improves communication security.

An authentication system includes an authentication unit that performs an authentication process between a first communication device and a second communication device when the first communication device and the second communication device communicate. The authentication unit performs the authentication process by transmitting authentication information from one of the first communication device and the second communication device to the other one of the first communication device and the second communication device, calculating the authentication information with an encryption code in each of the first communication device and the second communication device, and evaluating a calculation result. During a processing series in the authentication process, the authentication unit performs a first authentication based on part of the calculation result transmitted between the first communication device and the second communication device and performs a second authentication based on another part of the calculation result transmitted between the first communication device and the second communication device.

With this configuration, the calculation result is divided into multiple parts and then transmitted. This hinders illegitimate actions using relays. Further, faking actions using a fake device will not be able to accomplish ID verification since the fake device does not have the calculation result. This improves the security of the authentication system.

In the authentication system, the authentication unit is arranged as a first authentication unit. The authentication system further includes a second authentication unit. When the first communication device and the second communication device communicate, the second authentication unit performs a detection process detecting whether a usage situation of the first communication device and the second communication device is in accordance with a situation that would occur when used by a legitimate user. During the processing series in the authentication process, the first authentication unit may perform the second authentication in association with the detection process.

With this configuration, in a case where part of the calculation result of the authentication process is transmitted in association with the detection process, even if the fake device attempts to establish communication in an illegitimate manner, the fake device cannot transmit the calculation result. Thus, communication cannot be established by the faking action. This hinders establishment of illegitimate communication not only for illegitimate actions using relays but also for faking actions. Thus, the security of the authentication system is improved.

In the authentication system, when the detection process is satisfactory, the first authentication unit may transmit at least part of the calculation result of the authentication process from one of the first communication device and the second communication device to the other one of the first communication device and the second communication device.

With this configuration, if a faking action attempts to accomplish satisfactory detection process in an illegitimate manner, the faking action will also need the authentication process to be satisfactory. This improves the security of the authentication system.

In the authentication system, during the processing series in the authentication process, the first authentication unit may evaluate the calculation result with both of the first communication device and the second communication device.

This configuration allows both of the first communication device and the second communication device to detect illegitimate actions. This improves the security of the authentication system.

In the authentication system, the detection process performed by the second authentication unit may be distance detection that detects whether the first communication device and the second communication device are located within a certain distance of each other by performing a calculation on a distance measurement signal transmitted between the first communication device and the second communication device. The first authentication unit may transmit the distance measurement signal including at least part of the calculation result.

This configuration allows detection of an illegitimate action that fakes the distance between the first communication device and the second communication device to be a small value although the two devices are actually located at positions outside a certain distance of each other. This ensures the security against illegitimate actions, which fake the distance between the two devices.

In the authentication system, the first authentication unit may designate a position at which the calculation result is divided when transmitting a divided part of the calculation result.

With this configuration, if an illegitimate action using a fake device is performed, communication cannot be established unless the fake device has the designated position of the calculation result. This further improves the security of the authentication system.

In the authentication system, a process may be executed multiple times in which the authentication unit transmits the authentication information from one of the first communication device and the second communication device to the other one of the first communication device and the second communication device, performs a calculation on the authentication information with the encryption code in each of the first communication device and the second communication device, and evaluates the calculation result.

With this configuration, multiple calculation results are required to accomplish satisfactory authentication process. This improves the security of the authentication system.

In the authentication system, when the authentication process and the detection process are not satisfactory, the first authentication unit may retry the authentication process by transmitting new authentication information between the first communication device and the second communication device.

When the first ID verification communication is not established, a fake device may copy the calculation result. Accordingly, if the same calculation result is transmitted again in subsequent communication, the calculation result that is copied from the first time may be used for a faking action. In this respect, with this configuration, when the authentication process and the detection process are not satisfactory, the calculation result will be calculated with new authentication information. Thus, the calculation result copied from the first time cannot accomplish authentication. This further improves the security of the authentication system.

In the authentication system, during the processing series in the authentication process, the first authentication unit may calculate the authentication information only once and divide the calculation result into at least two.

In the authentication system, the authentication process and the detection process may use radio waves of different frequencies.

The present disclosure improves communication security.

DESCRIPTION OF THE EMBODIMENTS

First Embodiment

A first embodiment of an authentication system will now be described with reference to FIGS. 1 to 3.

Figure 1:
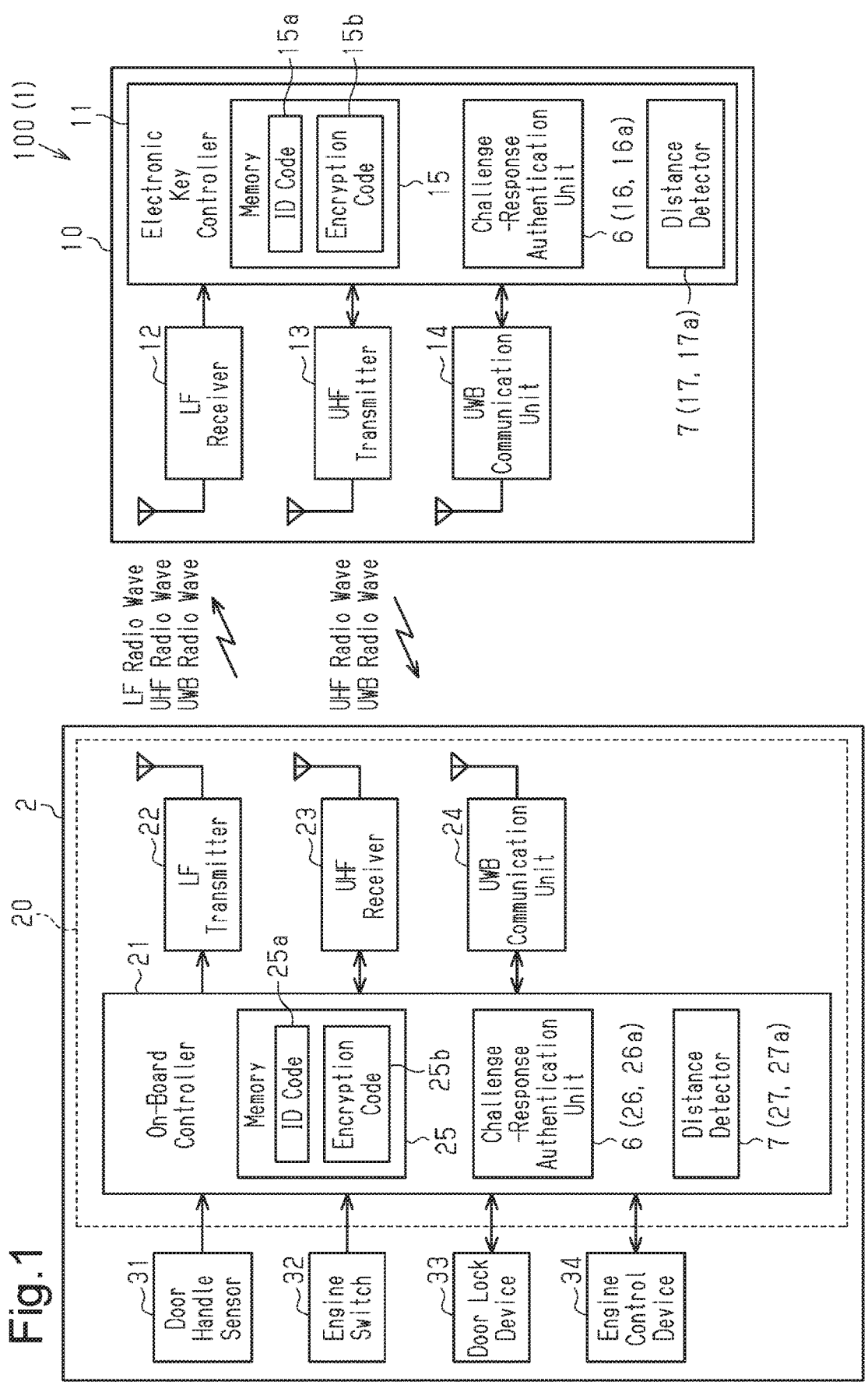
FIG. 1 is a block diagram illustrating the configuration of an authentication system in accordance with a first embodiment.

As illustrated in FIG. 1, a vehicle 2 includes an authentication system 100 (electronic key system 1 in present example) that authenticates the authenticity of an electronic key 10. The electronic key system 1 includes the electronic key 10 that is carried by a user and an on-board device 20 that is mounted on the vehicle 2. The electronic key 10 and the on-board device 20 correspond to a first communication device and a second communication device. In the electronic key system 1, a series of ID verification is automatically performed through mutual communication between the electronic key 10 and the on-board device 20. Under a condition that ID verification is accomplished in a proximate area of the vehicle 2, locking and unlocking of a door and starting of an engine are permitted or executed.

The electronic key 10 includes an electronic key controller 11 that controls actuation of the electronic key 10. Further, the electronic key controller 11 includes a memory 15 that stores a unique key ID code 15a that is used for ID verification. The electronic key 10 includes a LF receiver 12 that receives radio waves on a low frequency (LF) band, a UHF transmitter 13 that transmits radio waves on an ultra-high frequency (UHF) band, and a UWB communication unit 14 that transmits and receives radio waves on an ultra-wide band (UWB). The LF receiver 12, the UHF transmitter 13, and the UWB communication unit 14 are electrically connected to the electronic key controller 11. The electronic key controller 11 controls transmission and reception of the radio waves.

The on-board device 20, which is mounted on the vehicle 2, includes an on-board controller 21 that controls actuation of the on-board device 20. Further, the on-board controller 21 includes a memory 25 that stores an ID code 25a of the electronic key 10, which is registered to the on-board device 20. The on-board device 20 includes a LF transmitter 22 that transmits LF radio waves, a UHF receiver that receives UHF radio waves, and a UWB communication unit 24 that transmits and receives UWB radio waves. The LF transmitter 22, the UHF receiver 23, and the UWB communication unit 24 are electrically connected to the on-board controller 21. The on-board controller 21 controls the transmission and reception of the radio waves.

Further, the on-board controller 21 is electrically connected to various types of on-board devices in a manner allowing for control of the on-board devices. The on-board controller 21 is connected to a door handle sensor 31 and a door lock device 33. The door handle sensor 31 detects if a user has touched the door. The door lock device 33 locks and unlocks the door. Further, the on-board controller 21 is connected to an engine switch 32 that is operated when switching a vehicle power supply and an engine control device 34 that controls an engine.

The authentication system 100 includes a first authentication unit 6 that authenticates the electronic key 10 and the on-board device 20 by executing an authentication process using an encryption code. The authentication process is, for example, challenge-response authentication that checks the authenticity of the set of the electronic key 10 and the on-board device 20 by having each of the electronic key 10 and the on-board device 20 perform a calculation on a challenge code, the value of which differs whenever generated, with an encryption code and checking whether the calculated response code is correct.

The first authentication unit 6 in the present example includes an authentication unit 16 (challenge-response authentication unit 16a in present example) arranged in the electronic key 10 and an authentication unit 26 (challenge-response authentication unit 26a in present example) arranged in the on-board device 20. The challenge-response authentication unit 16a executes a calculation for challenge-response authentication based on an encryption code 15b that is stored in the memory 15. The challenge-response authentication unit 26a executes a calculation for challenge-response authentication based on an encryption code 25b that is stored in the memory 25.

The authentication system 100 includes a second authentication unit 7 that authenticates the communication between the electronic key 10 and the on-board device 20 by determining whether the usage situation is in accordance with a situation that would occur when used by a legitimate user. When the electronic key 10 and the on-board device 20 communicate, the second authentication unit 7 performs a detection process that determines whether the usage situation of the electronic key 10 and the on-board device 20 is in accordance with a situation that would occur when used by a legitimate user. A determination parameter of the usage situation includes, for example, the distance between the electronic key 10 and the on-board device 20, the position (coordinates) of the electronic key 10 relative to the on-board device 20, movement (vibration) of the electronic key 10, and the like. In the present example, the determination parameter of the usage situation is the distance between the electronic key 10 and the on-board device 20, and the detection process is distance detection that determines whether the two devices are within a certain distance of each other.

The second authentication unit 7 of the present example includes an authentication unit 17 (distance detector 17a in present example) arranged in the electronic key 10 and an authentication unit 27 (distance detector 27a in present example) arranged in the on-board device 20. In the distance detection of the present example, one of the electronic key 10 and the on-board device 20 transmits a distance measurement signal Sd on UWB radio waves to the other one of the electronic key 10 and the on-board device 20. Then, a calculation is performed with the distance measurement signal Sd to determine whether the electronic key 10 and the on-board device 20 are within a certain distance of each other. In this manner, the second authentication unit 7 prevents illegitimate actions using relays.

During the processing series in the authentication process (challenge-response authentication in present example), the first authentication unit 6 transmits part of a calculation result (response code in present example) to its counterpart and transmits another part of the calculation result in association with the detection process to the counterpart. In this manner, the first authentication unit 6 divides a response code, which is the calculation result of the challenge-response authentication, in order to prevent authentication accomplishment that is "faked". When the detection process of the second authentication unit 7 is the distance detection, "faked" accomplishment [that is, determining that the electronic key 10 and the on-board device 20 are within a certain distance of each other] is an illegitimate action that occurs during distance determination even though the electronic key 10 and the on-board device 20 are outside the certain distance of each other.

Figure 3:
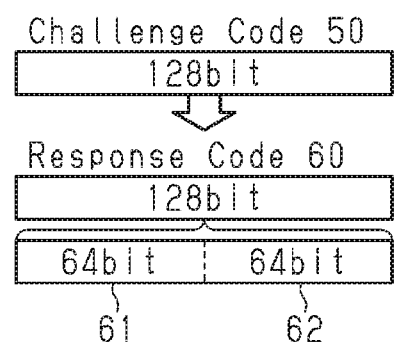
FIG. 3 is a block diagram illustrating the configuration of a response code in accordance with the first embodiment.

As illustrated in FIG. 3, a response code 60 is divided into two parts, namely, a first response 61 and a second response 62. The first response 61 is, for example, a signal of 64 bits and is authenticated by the on-board device 20 during normal challenge-response authentication communication (LF-UHF bidirectional communication). The second response 62 is, for example, a signal of 64 bits, and is authenticated by the on-board device 20 in association with the distance detection process.

The procedure of ID verification in the electronic key system 1 will now be described with reference to FIGS. 2 and 3. Here, the procedure for permitting unlocking of a vehicle door (legitimate communication) will be described under the assumption that the vehicle door is locked and the legitimate electronic key 10 is in a vehicle proximate area.

Figure 2:
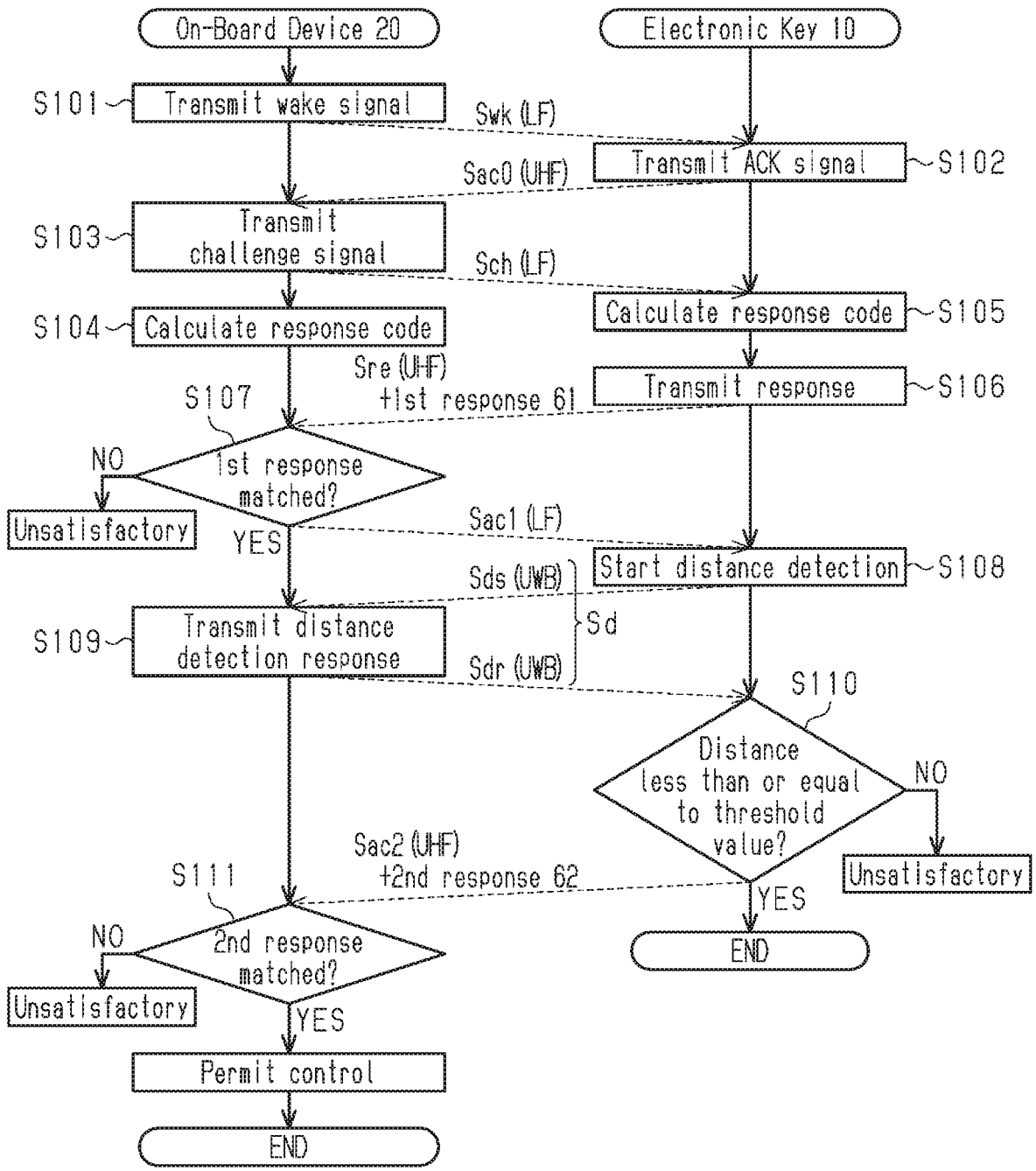
FIG. 2 is a flowchart illustrating an ID verification procedure in accordance with the first embodiment.

As illustrated in FIGS. 2 and 3, in step 101, the on-board device 20 performs polling and transmits a wake signal Swk (LF band) to the vehicle proximate area. When the electronic key 10 enters the vehicle proximate area during transmission of the wake signal Swk and receives the wake signal Swk, the electronic key 10 will be activated from a stand-by state and starts ID verification.

In step 102, when the electronic key 10 is switched to an activation state, the electronic key 10 transmits an acknowledgement signal Sac0 (UHF band) in response to the activation.

In step 103, the on-board device 20 generates a challenge signal Sch (LF band) for challenge-response authentication and transmits the challenge signal Sch to the electronic key 10. The challenge signal Sch includes a challenge code 50 of 128 bits, which is generated by the challenge-response authentication unit 26a, as one example of authentication information. The challenge code 50 is a random number having a value that is changed whenever generated.

In step 104, the challenge-response authentication unit 26a of the on-board device 20 calculates a response code 60 from the challenge code 50 using the encryption code 25b. In the present example, the response code 60 is obtained by performing a calculation on the challenge code 50, which is set as a plaintext, using the encryption code 25b in accordance with an encryption algorithm. The response code 60 corresponds to the calculation result.

In step 105, the electronic key 10 receives the challenge signal Sch. Subsequently, the challenge-response authentication unit 16a of the electronic key 10 calculates the response code 60 with the challenge code 50 included in the challenge signal Sch using the encryption code 15*b* in the same manner as the on-board device 20. The obtained response codes 60 are the same since the encryption codes 25*b* and 15*b* of the on-board device 20 and the electronic key 10 are the same. In this manner, whenever ID verification is performed, a unique response code 60 is calculated.

In step 106, the electronic key 10 (challenge-response authentication unit 16*a*) transmits the first response 61, which is part of the response code 60, on a response code Sre (UHF band). In the present example, in a case where the response code 60 is divided into two parts, the upper-order 64 bits will be referred to as the first response 61, and the lower-order 64 bits will be referred to as the second response 62.

In step 107, the challenge-response authentication unit 26*a* of the on-board device 20 verifies the first response 61 included in the received response code Sre with the first response 61 calculated by the on-board device 20. When the first responses 61 match each other, the on-board device 20 continues the ID verification process and transmits a response verification acknowledgement signal Sac (LF band). When the first responses 61 do not match each other, the on-board device 20 determines that the ID verification communication is "illegitimate communication" and forcibly ends the ID verification process. Since this case is an example of legitimate communication, the response authentication is accomplished, and step 108 is then performed. The response authentication using the first response 61 corresponds to a first authentication.

In step 108, the electronic key 10, which has received the response verification acknowledgement signal Sac1, starts the distance detection. In this case, the electronic key 10 (distance detector 17*a*) transmits a distance measurement start signal Sds (UWB band) to the on-board device 20. Further, the distance detector 17*a* starts measuring time from when the distance measurement start signal Sds was transmitted.

In step 109, the on-board device 20 (distance detector 27*a*), which has received the distance measurement start signal Sds, transmits a distance measurement response signal Sdr (UWB band) in response to the distance measurement start signal Sds. The distance measurement start signal Sds and the distance measurement response signal Sdr each correspond to the distance measurement signal Sd.

In step 110, when the electronic key 10 (distance detector 17*a*) receives the distance measurement response signal Sdr, the electronic key 10 checks the time measured by the distance detector 17*a*. The distance detector 17*a* calculates the distance between the vehicle 2 and the electronic key 10 based on the elapsed time from when the distance measurement start signal Sds was transmitted to when the distance measurement response signal Sdr was received. When the distance is less than or equal to a threshold value, the electronic key 10 determines that the distance detection is satisfactory and transmits a distance detection acknowledgement signal Sac2 (UHF band) indicating that the distance detection is satisfactory. In this case, the challenge-response authentication unit 16*a* transmits the second response 62, which is the remaining part of the remaining response code 60, in the distance measurement acknowledgement signal Sac2. When the distance between the vehicle 2 and the electronic key 10 exceeds the threshold value, the electronic key 10 determines that the ID verification communication is "illegitimate communication" and forcibly ends the ID verification process. Since this case is an example of legitimate communication, the distance detection is satisfactory, and step 111 is then performed.

In step 111, the challenge-response authentication unit 26*a* of the on-board device 20 verifies the second response 62 included in the distance measurement acknowledgement signal Sac2 with the second response 62 calculated by the on-board device 20. When the second responses 62 match each other, the on-board device 20 (on-board controller 21) permits control of the vehicle 2. Thus, when the on-board controller 21 confirms that the ID verification has been accomplished with the electronic key 10 located outside the vehicle, the on-board controller 21 permits control of the door lock device 33. In this state, when an operation performed by the user is detected, the door handle sensor 31 unlocks the vehicle door. When the second responses 62 do not match each other, the challenge-response authentication unit 26*a* determines that the ID verification communication is "illegitimate communication" and forcibly ends the ID verification process. The response authentication using the second response 62 corresponds to a second authentication.

When ID verification is not accomplished, ID verification will be retried. When retrying the ID verification, the process starts from step 101.

Figure 4:
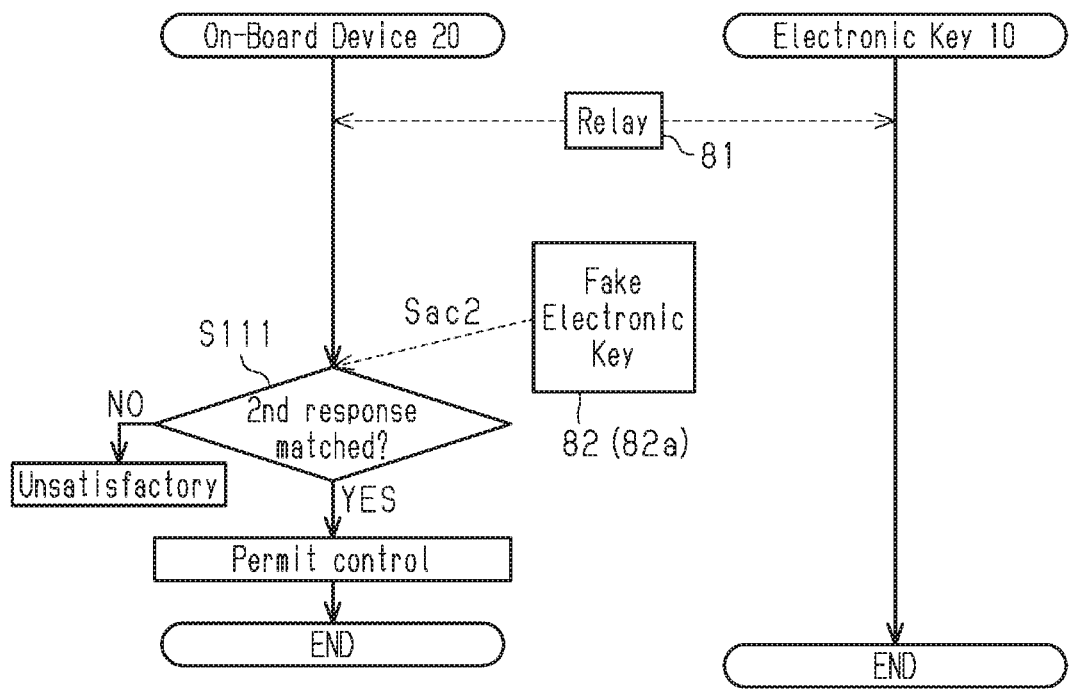
FIG. 4 is a simplified flowchart illustrating a faking action detection process in accordance with the first embodiment.

Operations and effects when illegitimate communication is performed in the electronic key system 1 of the first embodiment (in step 111) will now be described with reference to FIG. 4. In this case, it is assumed that although the vehicle 2 and the electronic key 10 are outside a certain distance of each other, communication is established between the on-board device 20 and the electronic key 10 via a relay 81 that is capable of relaying wireless communication between the two devices. The relay 81 may be one or more relays. Further, "faking" is performed by a fake device 82 (fake electronic key 82*a* in present example) that is capable of copying and transmitting the radio waves transmitted from the electronic key 10. It is also assumed that the fake electronic key 82*a* has intercepted past ID verification communication and copied the radio waves transmitted from the electronic key 10.

In illegitimate communication, authentication of the first response 61 that is performed in the former stage of ID verification communication may be accomplished in an illegitimate manner through communication with the relay 81. However, in the present case, it is assumed that the electronic key 10 and the on-board device 20 are outside a certain distance of each other. Thus, the electronic key 10 recognizes that the distance detection is not satisfactory through the distance detection, which is performed in the latter stage of ID verification communication, and will not transmit the second response 62. Accordingly, actuation of the vehicle 2 will not be permitted by the on-board device 20.

In this case, the fake electronic key 82*a* transmits the distance measurement acknowledgement signal Sac2, which had been copied in advance, to the on-board device 20 to fake satisfactory distance detection. In other words, the fake electronic key 82*a* attempts to have the on-board device 20 recognize satisfactory distance detection even though distance detection with the legitimate electronic key 10 would not be satisfactory.

In step 111, the on-board device 20 verifies the second response 62 included in the distance measurement acknowledgement signal Sac2, which is transmitted from the fake electronic key 82*a*. Here, the response code 60 (second response 62) is unique to this ID verification and differs from the response code 60 (second response 62) calculated in previous ID verification. The distance measurement acknowledgement signal Sac2 transmitted by the fake electronic key 82*a* is a copy of the previous ID verification communication and thereby not included in the correct second response 62. Accordingly, step 111 is not accomplished. In this manner, even if a faking action is performed, communication will not be established.

As described above, in the present example, part of the response code 60 (second response 62) is transmitted in the distance measurement acknowledgement signal Sac2 in association with the detection process during the processing series in the authentication process (challenge-response) to detect illegitimate actions using the fake device 82. In this manner, even if the fake device 82 is used in addition to the relay 81, the ID verification will not be accomplished in an illegitimate manner. This improves the security of the authentication system 100.

In the present example, when the detection process is satisfactory in step 110, the distance measurement acknowledgement signal Sac2 is transmitted including part of the response code 60 (second response 62). Thus, a faking action that attempts to establish communication in an illegitimate manner will also need the authentication process to be satisfactory. This improves the security of the authentication system 100.

In the present example, if ID verification is not accomplished, ID verification will be restarted from step 101. In this manner, if the second response 62 is not verified when step 111 is performed for the first time, the response code will be calculated with a new challenge code (step 103 to step 105). Thus, ID verification will not be accomplished with the second response 62 that is copied from the first time. This further ensures the security of the authentication system 100.

In the present example, the response code 60 that is obtained by the same calculation is divided into the first response 61 and the second response 62. The first response 61 and the second response 62 undergo correctness determination at chronologically different points in time to authenticate communication. This allows the response code 60 to be calculated by the electronic key 10 (on-board device 20) only once in step 105 (step 104). Consequently, ID verification that improves the security of the authentication system 100 is performed without lengthening the required time for authentication. Also, since relatively few processes are executed by the electronic key 10, electric power is saved.

In the present example, UHF radio waves are used for the challenge-response and UWB radio waves are used for the distance detection. Thus, a person who attempts to perform illegitimate actions and faking actions needs to be able to transmit and receive multiple types of radio waves. This hinders illegitimate actions and faking actions thereby improving the security of the authentication system 100. Further, the challenge-response authentication is performed through LF-UHF communication. This reduces electric power consumption compared to when the communication uses, for example, a frequency in UWB or the like.

Second Embodiment

The ID verification in accordance with a second embodiment will now be described with reference to FIGS. 5 and 6. The second embodiment differs from the first embodiment in that the response code 60 is divided into three parts and that both the electronic key 10 and the on-board device 20 perform response authentication. Therefore, same reference numerals are given to those components that are the same as the corresponding components of the first embodiment. Such components will not be described in detail, and the description will focus on only the differences. The processes in step 201 to step 206 are the same as the process described in the first embodiment.

Figure 6:
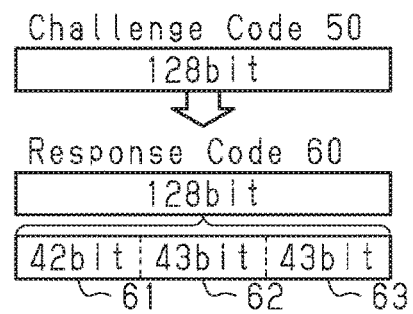
FIG. 6 is a block diagram illustrating the configuration of a response code in accordance with the second embodiment.

As illustrated in FIG. 6, the response code 60 in the present example is divided into three parts, namely, the first response 61, the second response 62, and a third response 63. The first response 61 is, for example, a signal of 42 bits, and is authenticated by the on-board device 20 during normal challenge-response authentication communication (bidirectional LF-UHF communication). The second response 62 is, for example, a signal of 43 bits, and is authenticated by the electronic key 10 in association with the distance detection process (during the distance detection process). The third response 63 is, for example, a signal of 43 bits, and is authenticated by the on-board device 20 in association with the distance detection process (after satisfactory distance detection).

Figure 5:
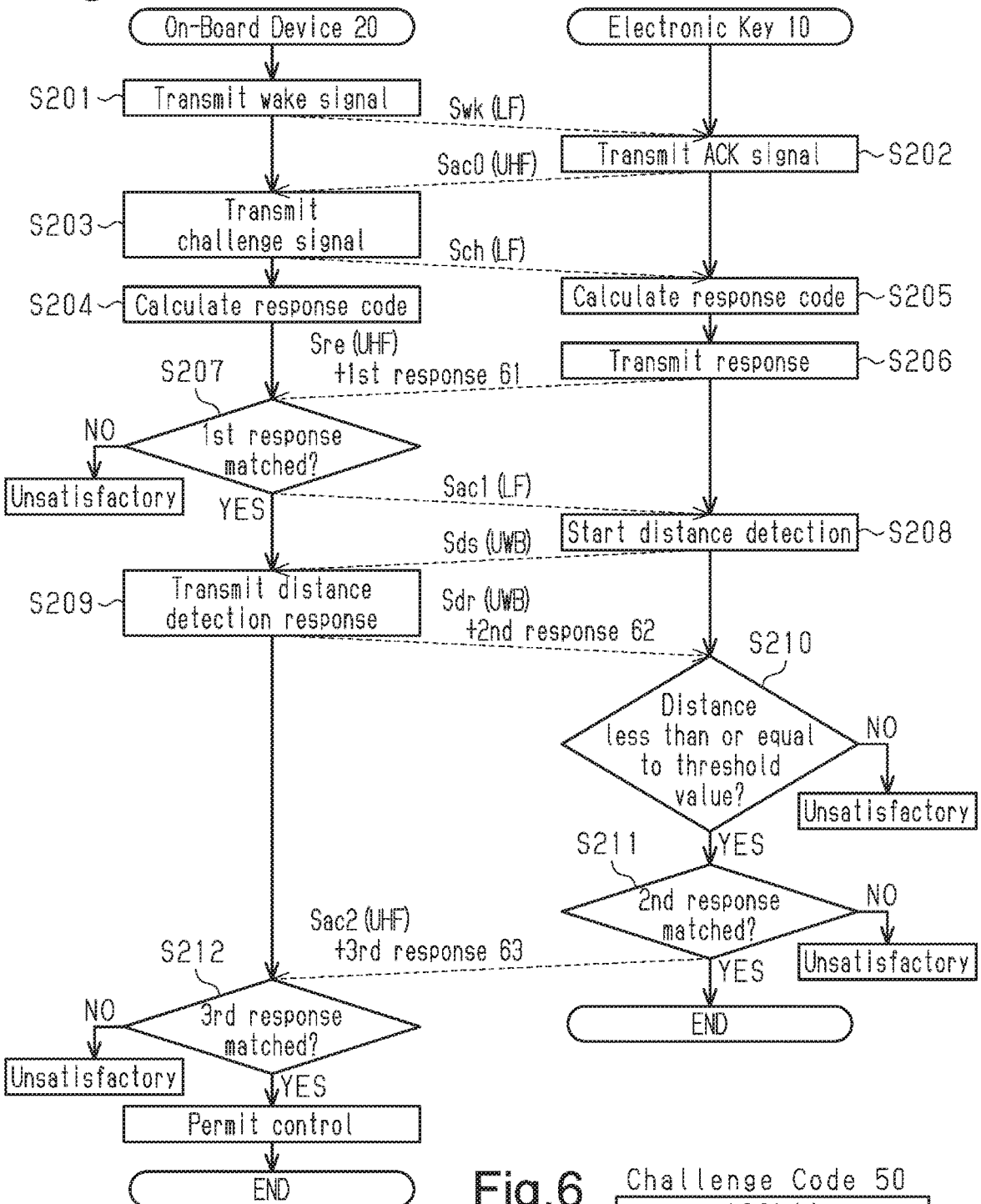
FIG. 5 is a flowchart illustrating an ID verification procedure in accordance with a second embodiment.

As illustrated in FIG. 5, in step 206, the challenge-response authentication unit 16a of the electronic key 10 transmits the first response 61, which is part of the response code 60, on the response code Sre. In the present example, when the response code 60 is divided into three parts, the uppermost-order 42 bits will be referred to as the first response 61, the next 43 bits in the data string will be referred to as the second response 62, and the lowermost-order 43 bits will be referred to as the third response 63.

In step 207, the challenge-response authentication unit 26a of the on-board device 20 verifies the first response 61 included in the response code Sre with the first response 61 calculated by the on-board device 20. Since this case is an example of legitimate communication, the first response 61 is authenticated. When the response authentication is accomplished, the on-board device 20 transmits the response verification acknowledgement signal Sac1.

In step 208, the distance detector 17a of the electronic key 10 transmits the distance measurement start signal Sds.

In step 209, the distance detector 27a of the on-board device 20 transmits the distance measurement response signal Sdr in response to the distance measurement start signal Sds. In this case, the challenge-response authentication unit 26a transmits the second response 62 on the distance measurement response signal Sdr.

In step 210, the distance detector 17a of the electronic key 10 calculates the distance between the electronic key 10 and the vehicle 2. Since this case is an example of legitimate communication, the detection process is satisfactory, and step 211 is then performed.

In step 211, the challenge-response authentication unit 16a of the electronic key 10 determines whether the second response 62 included in the distance measurement response signal Sdr matches the second response 62 calculated by the electronic key 10. Since this case is an example of legitimate communication, the distance detection is satisfactory. When this response authentication is accomplished, the challenge-response authentication unit 16a of the electronic key 10 transmits the distance measurement acknowledgement signal Sac2. The transmitted distance measurement acknowledgement signal Sac2 includes the third response 63.

In step 212, the challenge-response authentication unit 26a of the on-board device 20 verifies the third response 63 included in the distance measurement acknowledgement signal Sac2 with the third response 63 calculated by the on-board device 20. Since this case is an example of legitimate communication, the third response 63 is authenticated. When the third responses 63 match each other, the on-board device 20 (on-board controller 21) permits control of the vehicle 2.

Figure 7:
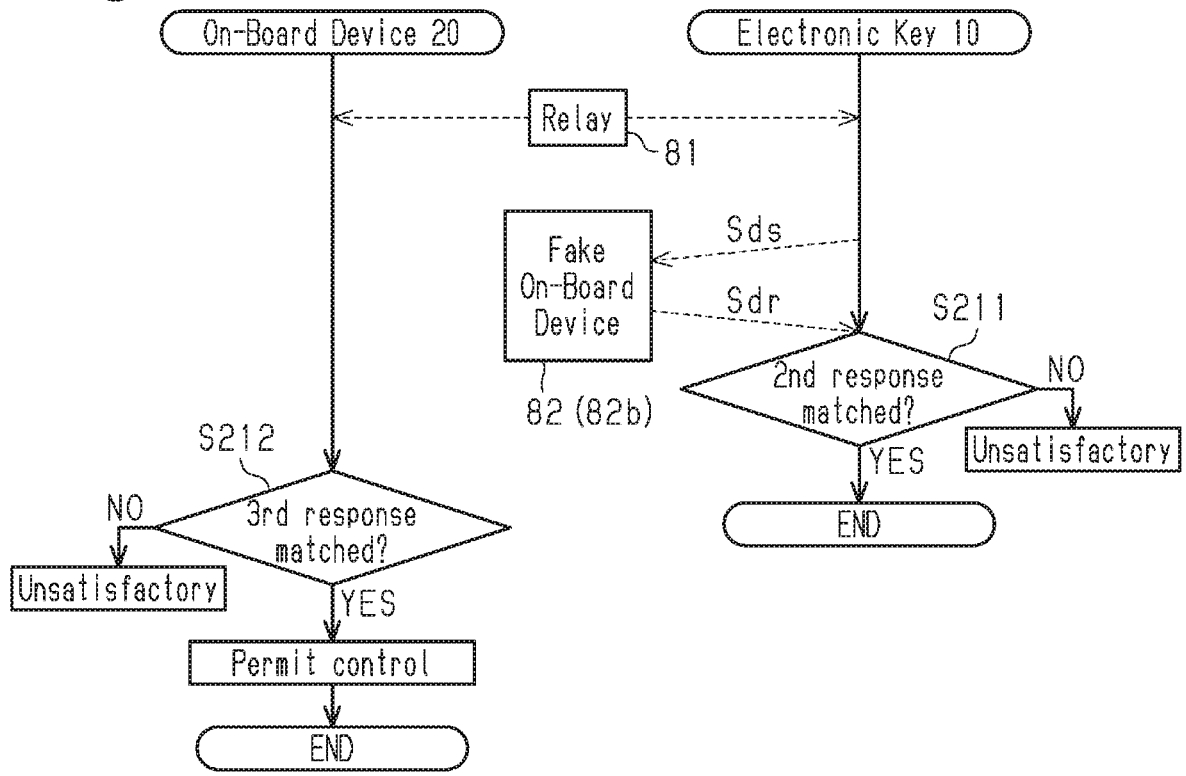
FIG. 7 is a simplified flowchart illustrating a faking action detection process in accordance with the second embodiment.

Operations and effects when illegitimate communication is performed in the electronic key system 1 of the second embodiment (in step 211) will now be described with reference to FIG. 7. In this case, it is assumed that although the vehicle 2 and the electronic key 10 are outside a certain distance of each other, communication is established between the on-board device 20 and the electronic key 10 by the relay 81 that is capable of relaying wireless communication between the two devices. Further, "faking" is performed by the fake device 82 (fake on-board device 82b in present example) that is capable of copying and transmitting the radio waves transmitted from the on-board device 20. It is also assumed that the fake on-board device 82b has intercepted past ID verification communication and copied the radio waves transmitted from the on-board device 20.

In the case of illegitimate communication in which the fake on-board device 82b is used, the legitimate electronic key 10 measures the distance between the fake on-board device 82b that is located nearby. In the case of illegitimate communication, the fake on-board device 82b is located within a certain distance of the electronic key 10. Accordingly, the distance detection may be satisfactory even though the electronic key 10 and the vehicle 2 are outside the certain distance of each other.

However, the fake on-board device 82b does not have the response code 60 that is unique to this communication. Thus, the fake on-board device 82b cannot include the correct second response 62 in the distance measurement response signal Sdr. Accordingly, in step 211, the challenge-response authentication unit 16a of the electronic key 10 determines that the second response 62 has not been verified. Thus, even if the fake on-board device 82b performs illegitimate communication, such illegitimate communication will be detected so that communication will not be established.

Figure 8:
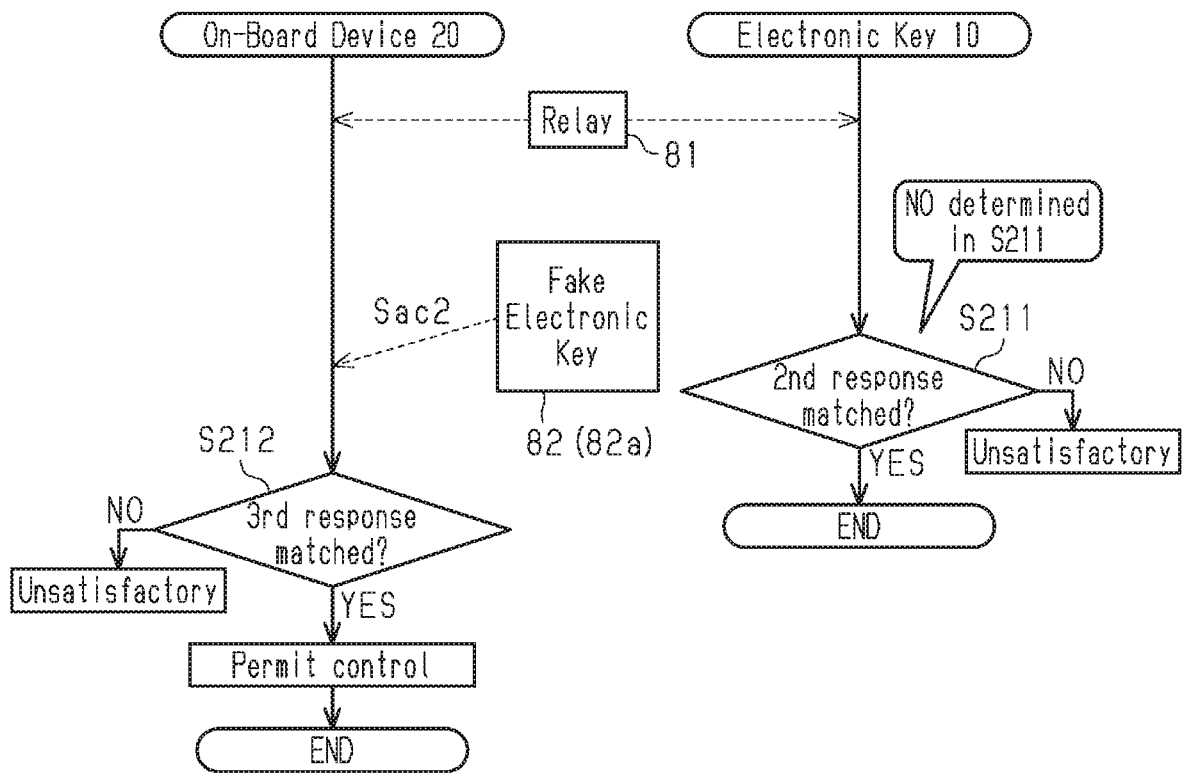
FIG. 8 is a simplified flowchart illustrating a faking action detection process in accordance with the second embodiment.

Further, as illustrated in FIG. 8, in illegitimate communication using the fake electronic key 82a, the fake electronic key 82a may transmit the distance measurement acknowledgement signal Sac2 to the on-board device 20 faking satisfactory distance detection. In this case, the distance detection is performed in a state in which the electronic key 10 and the on-board device 20 are outside a certain distance of each other. Thus, in step 211, the distance detection is determined as not being satisfactory. This stops actuation of the legitimate electronic key 10. Consequently, the on-board device 20 will not permit actuation of the vehicle 2.

Here, the fake electronic key 82a does not have the response code 60 that is unique to this communication. Thus, the fake electronic key 82a cannot include the correct third response 63 in the distance measurement acknowledgement signal Sac2. Accordingly, in step 212, the challenge-response authentication unit 26a of the on-board device 20 determines that the third response 63 has not been verified. Thus, even if the fake electronic key 82a performs illegitimate communication, such illegitimate communication will be detected so that communication will not be established.

In the present example, in addition to the on-board device 20 performing response authentication using part of the response code 60, the electronic key 10 also performs response authentication using another part of the response code 60 included in the distance measurement signal Sd (distance measurement response signal Sdr). This detects illegitimate communication that fakes the distance between the electronic key 10 and the on-board device 20 with the fake on-board device 82b and hinders establishment of illegitimate communication between the two devices.

Also, the response code 60 is divided into three parts, the electronic key 10 authenticates the second response 62 (step 211), and the on-board device 20 authenticates the third response 63 (step 212). This allows both of the electronic key 10 and the on-board device 20 to detect illegitimate actions using the fake electronic key 82a in addition to detecting illegitimate communication using the fake on-board device 82b. This is highly effective for ensuring the security when establishing communication.

Third Embodiment

The ID verification in accordance with a third embodiment will now be described with reference to FIGS. 9 and 10. The third embodiment differs from the first embodiment and the second embodiment in that positions at which the response code 60 is divided are designated. Therefore, the description of the present example will focus on only the differences. The procedure from step 301 to step 305 is the same as the first embodiment.

Figure 10:
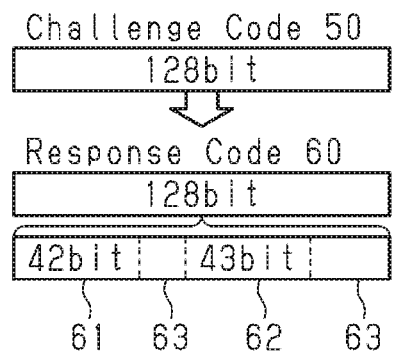
FIG. 10 is a block diagram illustrating the configuration of a response code in accordance with the third embodiment.

As illustrated in FIG. 10, the authentication unit 16 (challenge-response authentication unit 16a) designates a position at which the response code 60 is divided before the on-board device 20 transmits parts of the response code 60 to the electronic key 10. In the present example, when transmitting the distance measurement signal Sd (distance measurement start signal Sds) to the on-board device 20 through UWB transmission, the challenge-response authentication unit 16a includes a response position designator (position designation information 90) in the distance measurement signal Sd. The response position designator indicates the part of the response code 60 that the on-board device 20 will transmit (i.e., divide).

The response code 60 is, for example, divided into three parts (first response 61, second response 62, and third response 63). The first response 61 corresponds to one-third of the response code 60 that is the upper-order 42 bits. The second response 62 is position-designated bit data. In the present example, the second response 62 is a bit string of a predetermined portion subsequent to the first response 61. The third response 63 corresponds to bit portions subsequent to the first response 61 and excluding the second response 62.

Figure 9:
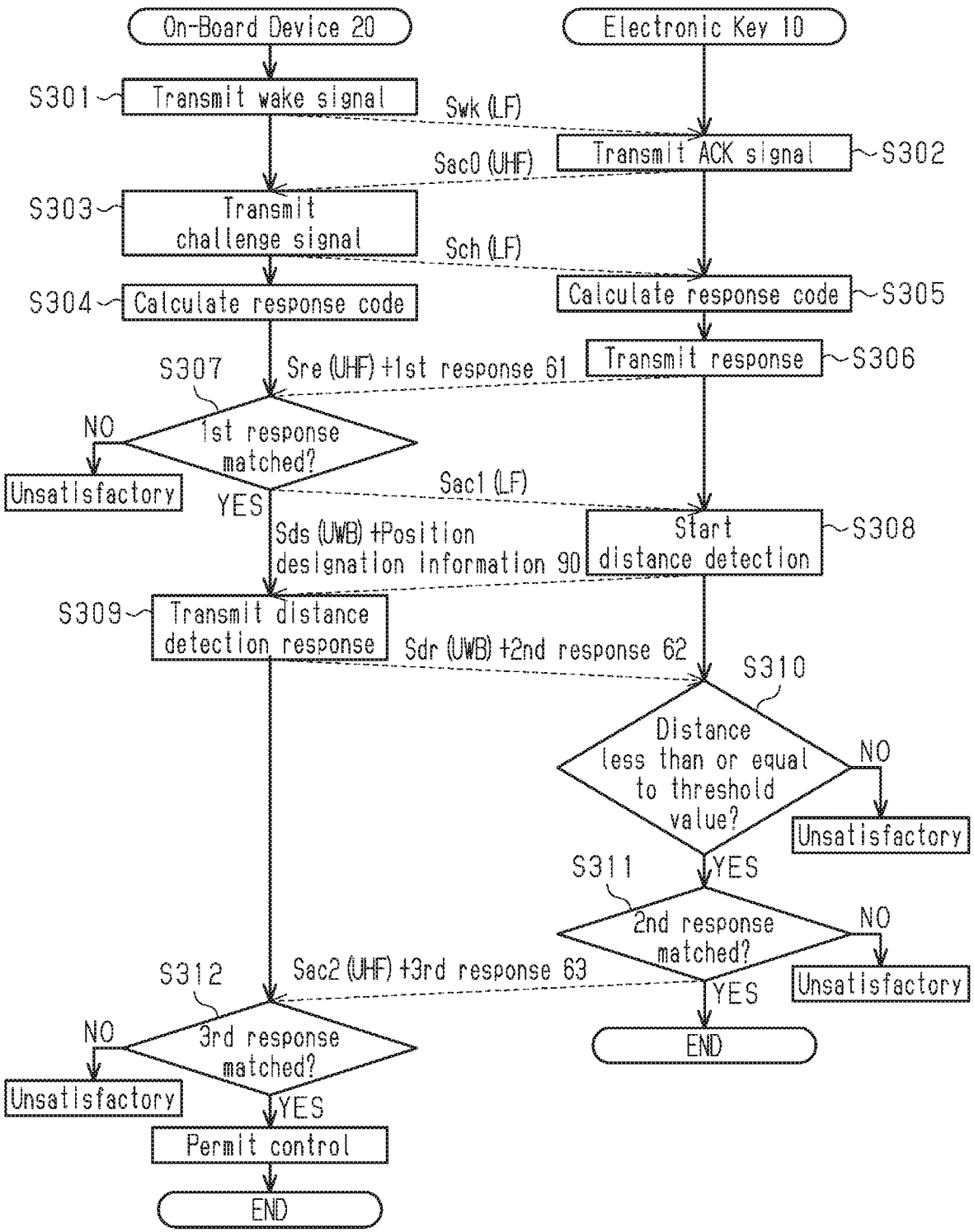
FIG. 9 is a flowchart illustrating an ID verification procedure in accordance with a third embodiment.

As illustrated in FIG. 9, in step 306, the challenge-response authentication unit 16a of the electronic key 10 transmits the response code Sre including the first response 61. The first response 61 is the upper-order 42 bits corresponding to one-third of the response code 60.

In step 307, the challenge-response authentication unit 26a of the on-board device 20 verifies the first response 61. Since this case is an example of legitimate communication, response authentication is accomplished. When this response authentication is accomplished, the challenge-response authentication unit 26a transmits the response verification acknowledgement signal Sac1.

In step 308, the challenge-response authentication unit 16a of the electronic key 10 transmits the position designation information 90, which designates the position at which the second response 62 (and third response 63) are divided in the response 60, on the distance measurement start signal Sds. The position designation information 90 is an instruction that notifies the on-board device 20 of the bit position in the calculated response code 60 from where information is to be returned to the electronic key 10.

In step 309, the challenge-response authentication unit 26a of the on-board device 20 divides the response code 60 based on the position designation information 90 to generate the second response 62. Then, the challenge-response authentication unit 26a transmits the second response 62 on the distance measurement response signal Sdr.

In step 310, the distance detector 17a of the electronic key 10 measures the distance based on the received distance measurement response signal Sdr. Since this case is an example of legitimate communication, the distance detection is satisfactory, and step 311 is then performed.

In step 311, the challenge-response authentication unit 16a of the electronic key 10 verifies the second response 62 included in the distance measurement response signal Sdr. Here, a verification is performed by checking whether the second response 62 of the electronic key 10, which resulted from the division based on the position designation information 90, matches the second response 62 included in the distance measurement response signal Sdr. Since this case is an example of legitimate communication, the second response 62 is authenticated. When this response authentication is accomplished, the challenge-response authentication unit 16a of the electronic key 10 transmits the distance measurement acknowledgement signal Sac2 including the third response 63. The third response 63 is the remaining portion of the response code 60 that was not used as the first response 61 or the second response 62.

In step 312, the challenge-response authentication unit 26a of the on-board device 20 verifies the third response 63. Since this case is an example of legitimate communication, this response authentication is accomplished, and the on-board controller 21 permits control of the vehicle 2.

Operations and effects when illegitimate communication is performed in the electronic key system 1 of the third embodiment (in step 311) will now be described with reference to FIG. 11. In this case, it is assumed that although the vehicle 2 and the electronic key 10 are outside a certain distance of each other, communication is established between the on-board device 20 and the electronic key 10 by the relay 81 that is capable of relaying wireless communication between the two devices. Further, "faking" is performed by the fake device 82 (fake electronic key 82a in present example) that is capable of copying and transmitting the radio waves transmitted from the electronic key 10. It is also assumed that that fake electronic key 82a has intercepted past ID verification communication and copied the radio waves transmitted from the electronic key 10.

Figure 11:
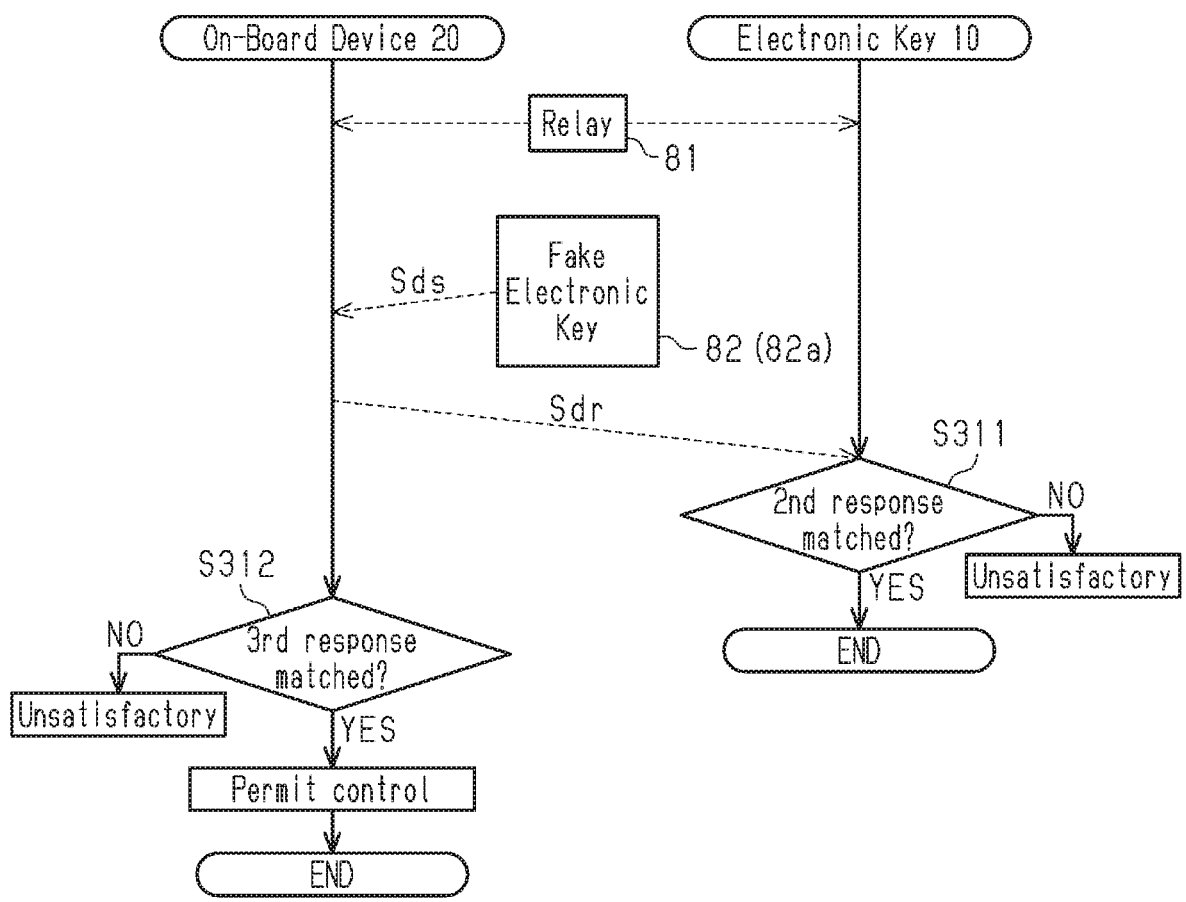
FIG. 11 is a simplified flowchart illustrating a faking action detection process in accordance with the third embodiment.

As illustrated in FIG. 11, in the proximity of the vehicle 2, the fake electronic key 82a transmits the distance measurement start signal Sds to the on-board device 20. In this case, the arrival time at which the distance measurement start signal Sds transmitted from the fake electronic key 82a arrives at the on-board device 20 is earlier than the arrival time at which the distance measurement start signal Sds transmitted from the electronic key 10 arrives at the on-board device 20. Accordingly, even though the electronic key 10 is actually located at a position remote from the on-board device 20, the distance detection performed in step 310 may be satisfactory.

However, the fake electronic key 82a has not obtained the position designation information 90 and cannot add the second response 62 including the correct bit position to the distance measurement response signal Sdr. Accordingly, in step 311, the challenge-response authentication unit 16a determines that authentication of the second response 62 has not been accomplished. Accordingly, even if the fake electronic key 82a transmits the distance measurement signal Sd (distance measurement start signal Sds) to the on-board device 20 and performs illegitimate communication, such communication will be detected. Thus, communication will not be established.

In the present example, the on-board device 20 performs response authentication using part of the response code 60. In addition, another part of the response code 60 (second response 62) is carried on the distance measurement signal Sd (distance measurement response signal Sdr) so that the electronic key 10 performs response authentication. Further, in the present example, the electronic key 10 transmits the position designation information 90, which designates the position of a bit string in the second response 62, on the distance measurement start signal Sds. Thus, even if the fake electronic key 82a transmits the distance measurement signal Sd (distance measurement start signal Sds) to the on-board device 20 and performs illegitimate communication, such illegitimate communication is detected.

Also, in the present example, the position designation information 90 is generated to designate a position at which the second response 62 (third response 63) is divided. Thus, when an illegitimate action is performed with the fake device 82, illegitimate communication cannot be established without knowing the designated position of the response code 60. This further improves the security of the electronic key system 1.

The present embodiments may be modified as follows. The present embodiments and the following modifications can be combined as long as the combined modifications remain technically consistent with each other.

In each embodiment, the distance measurement start signal Sds may be transmitted from the on-board device 20. The ID verification procedure when the distance measurement start signal Sds is transmitted from the on-board device 20 will now be described with reference to FIG. 12. In this case, communication is legitimate.

Figure 12:
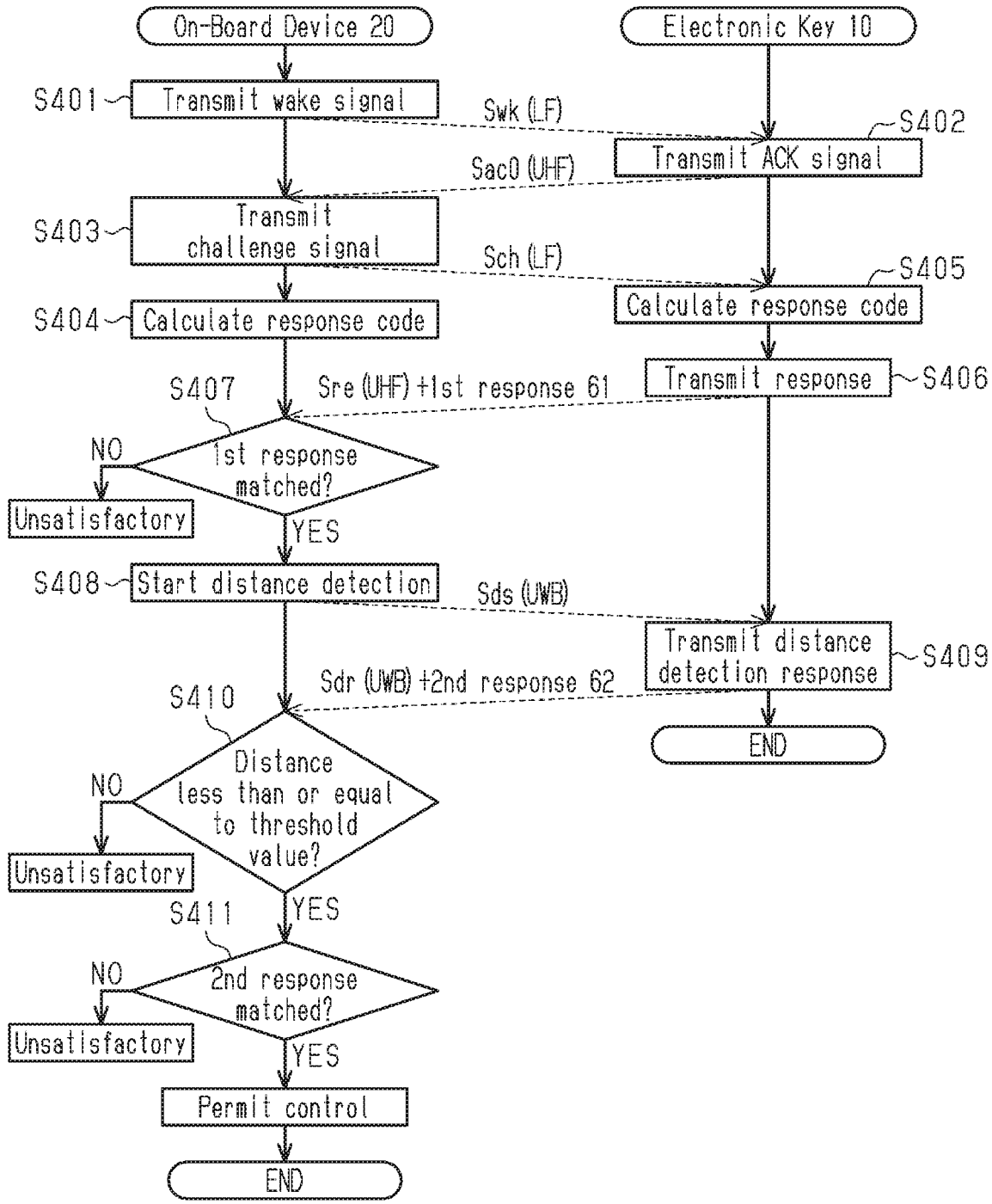
FIG. 12 is a flowchart illustrating an ID verification procedure in accordance with another embodiment.

As illustrated in FIG. 12, the procedure from step 401 to step 406 are the same as the first embodiment.

In step 407, when verification of the first response 61 is accomplished, the on-board device 20 proceeds to step 408.

In step 408, the distance detector 27a of the on-board device 20 transmits the distance measurement start signal Sds. Further, the distance detector 27a starts measuring time from when the distance measurement start signal Sds was transmitted.

In step 409, the challenge-response authentication unit 16a of the electronic key 10 transmits the distance measurement response signal Sdr including the second response 62.

In step 410, the distance detector 27a of the on-board device 20 checks the time from when the distance measurement start signal Sds was transmitted to when the distance measurement response signal Sdr was received. The distance detector 27a calculates the distance between the electronic key 10 and the vehicle 2 based on the measured time. When the calculated distance is less than or equal to a threshold value, the on-board device 20 proceeds to the step 411.

In step 411, the challenge-response authentication unit 26a of the on-board device 20 verifies the second response 62. When the second responses 62 match, the on-board device 20 permits control of the vehicle 2.

Such configuration also hinders faking actions.

Each embodiment is not limited to an example in which the challenge code 50 is transmitted only once to perform the challenge-response authentication. For example, the challenge code 50 may be transmitted multiple times and the response code 60 may be calculated multiple times. The procedure taken in this case will now be described with reference to FIGS. 13 and 14.

Figure 13:
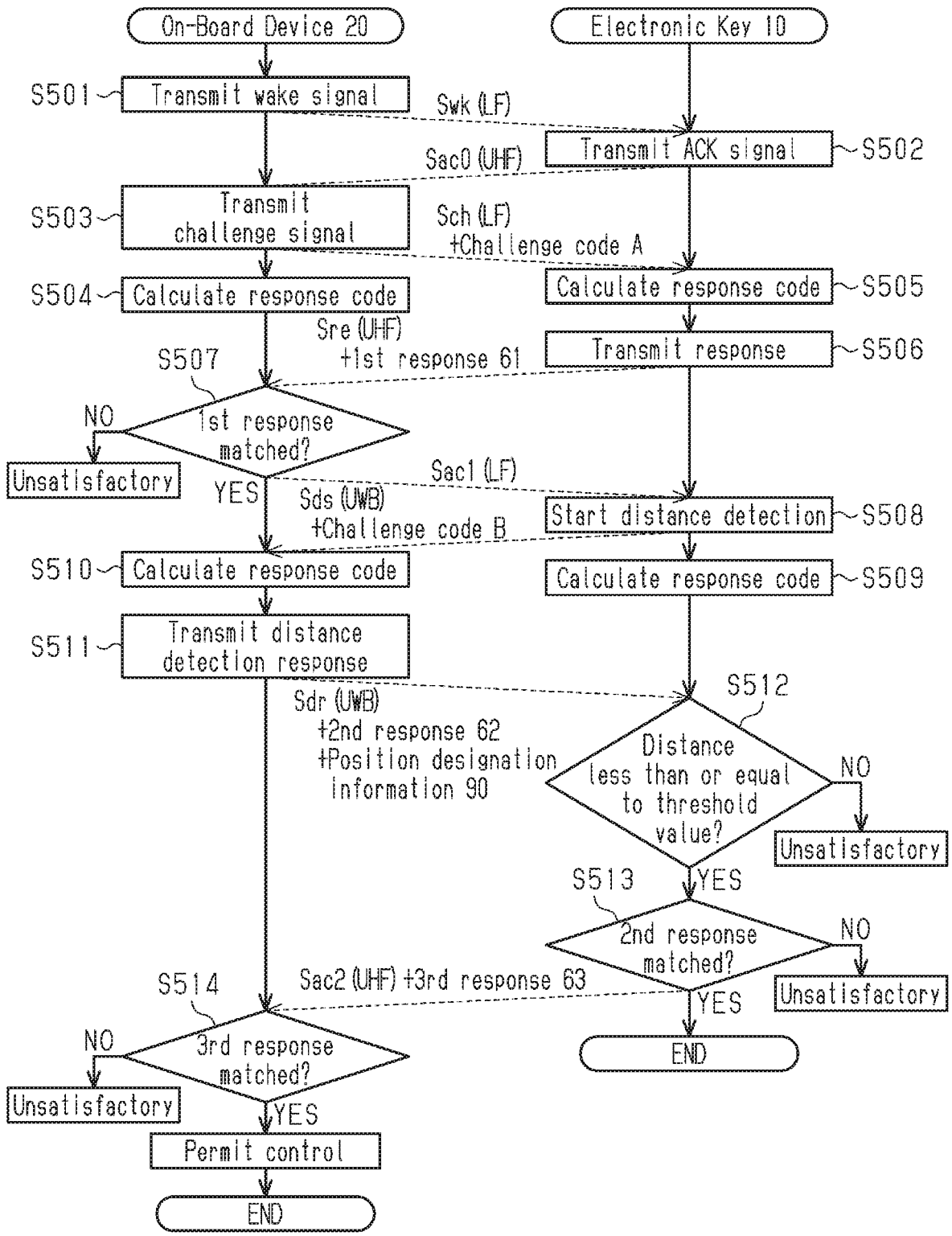
FIG. 13 is a flowchart illustrating an ID verification procedure in accordance with a further embodiment.
Figure 14:
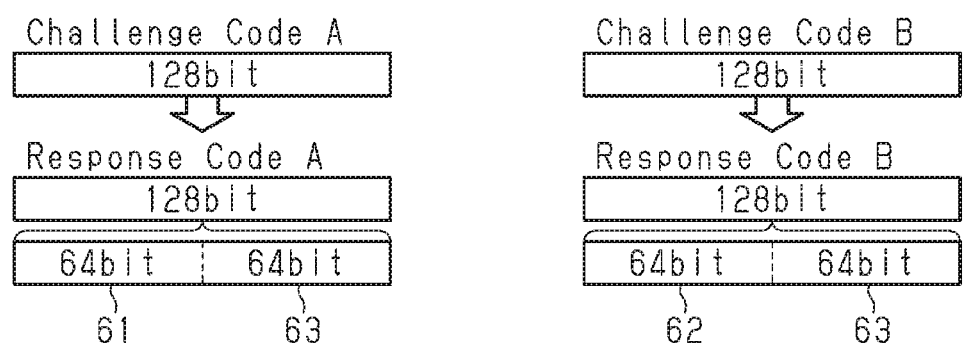
FIG. 14 is a block diagram illustrating the configuration of a response code in accordance with the further embodiment.

As illustrated in FIGS. 13 and 14, in step 503, the challenge-response authentication unit 26a of the on-board device 20 transmits challenge code A.

In step 504 and step 505, the on-board device 20 and the electronic key 10 each calculate response code A based on the challenge code A.

In step 506, the challenge-response authentication unit 16a of the electronic key 10 transmits the first response 61 in the response code Sre. In this case, the first response 61 is the upper-order 64 bits of response code A.

In step 507, the challenge-response authentication unit 26a of the on-board device 20 verifies the first response 61 and transmits the response verification acknowledgement signal Sac when the verification is accomplished.

In step 508, the challenge-response authentication unit 16a of the electronic key 10 transmits challenge code B on the distance measurement start signal Sds.

In step 509 and step 510, the on-board device 20 and the electronic key 10 each calculate response code B based on challenge code B.

In step 511, the challenge-response authentication unit 26a of the on-board device 20 transmits the second response 62 on the distance measurement response signal Sdr. In this case, the second response 62 is the upper-order 64 bits of response code B. Further, the distance measurement response signal Sdr includes the position designation information 90 that designates the position of the third response 63.

When the distance detection is satisfactory in step 512 and the second response 62 is verified in step 513, the electronic key 10 (challenge-response authentication unit 16a) transmits the third response 63 on the distance measurement acknowledgement signal Sac2. The third response 63 is either the lower-order 64 bits of response code A or the lower-order 64 bits of response code B that is designated by the position designation information 90. The remaining non-designated portion will not be transmitted during the series of ID verification procedure.

Such configuration also hinders faking actions.

In each embodiment, the second authentication unit 7 may be omitted. For example, the first authentication and the second authentication may be performed by one of the electronic key 10 and the on-board device 20 transmitting the challenge code 50 to the other one of the electronic key 10 and the on-board device 20 so that the other one of the electronic key 10 and the on-board device 20 divides the calculated response code 60 into two or more parts and returns the divided response code 60. In this case, the response code 60 is also divided into multiple parts and then transmitted. This hinders illegitimate actions using relays. Further, faking actions using a fake device will not be able to accomplish ID verification since the correct response code 60 is unknown to the fake device.

In each embodiment, when ID verification is not accomplished, the response code 60 (or portion of thereof) may be transmitted again and a retry may be attempted from the middle of the processing series. However, the fake device 82 may copy the response code 60 in the first communication. Thus, the response code 60 may be generated each time.

In the third embodiment, the position designation information 90 may be included in the response verification acknowledgement signal Sac1 or the distance measurement start signal Sds. This case also improves the security of the authentication system.

In the third embodiment, the position designation information 90 may be transmitted multiple times.

In the third embodiment, there is no particular limitation to content of the positional information designated by the position designation information 90, that is, how to designate a position at which the second response 62 (third response 63) is divided. For example, multiple discontinuous positions of the response code 60 may be designated. Alternatively, odd numbers (even numbers) of the response code 60 may be designated.

In each embodiment, part of the response code 60 may be transmitted on the distance measurement start signal Sds or on the response verification acknowledgement signal Sac1.

In each embodiment, the number of parts into which the response code 60 is divided is not limited. For example, each quadrant of the response code 60 may be transmitted on the distance measurement start signal Sds, the distance measurement response signal Sdr, and the distance measurement acknowledgement signal Sac2. In this manner, as long as at least part of the calculation result is transmitted in association with the detection process, the calculation result of the authentication process (response code 60) may be transmitted on any signal.

In each embodiment, the determination parameter that detects whether the usage situation is in accordance with that would occur when used by a legitimate user is not limited to the distance between the vehicle 2 and the electronic key 10. For example, the parameter may be the position (coordinates) of the electronic key 10 relative to the on-board device 20, movement (vibration) of the electronic key 10, or the like. This case also hinders faking as long as part of the calculation result of the authentication process (response code 60) is transmitted in association with the detection process.

In each embodiment, the distance may be detected in any manner. The distance may be calculated by a known method. Further, in the present example, the distance is detected using two messages, namely, the distance measurement start signal Sds and the distance measurement response signal Sdr. Alternatively, the distance may be detected using three or more messages. Increases in the number of messages improve the accuracy of the distance detection.

In each embodiment, the length of the response code 60 is not limited to 128 bits.

In each embodiment, a divided response of the response code 60 may have any length. Also, the response code 60 does not have to be divided evenly.

In each embodiment, the first response 61, the second response 62, and the third response 63 extracted from the response code 60 may overlap with each other.

In each embodiment, the response code 60 may be divided into any number of parts. Further, part of the response code 60 does not have to be transmitted during the processing series.

In each embodiment, the response code 60 may be verified in only one step. For example, in a case where the first response 61 and the second response 62 are transmitted separately, both responses may be verified at the same time as when the second response 62 is received (step 111 in first embodiment).

In each embodiment, in the distance detection, in a case where the distance between the vehicle 2 and the electronic key 10 exceeds a threshold value, that is, in a case where the distance detection is not satisfactory, the distance measurement acknowledgement signal Sac2 may be transmitted from the electronic key 10 (or on-board device 20) indicating that the distance detection is not satisfactory.

In each embodiment, wireless communication may have any bandwidth. However, illegitimate actions are hindered when the authentication process and the detection process have different bandwidths.

In each embodiment, the authentication system does not have to be applied to a vehicle. For example, the authentication system may be used for locking and unlocking of a house door.

Technical concepts that can be understood from the above embodiments and the modified examples will now be described.

An authentication method including: transmitting authentication information from one of a first communication device and a second communication device to the other one of the first communication device and the second communication device when the first communication device and the second communication device communicate; calculating the authentication information using an encryption code in each of the first communication device and the second communication device; performing an authentication process between the first communication device and the second communication device by evaluating a calculation result; and performing a detection process that detects whether a usage situation of the first communication device and the second communication device is in accordance with a situation that would occur when used by a legitimate user, where the authentication process includes performing a first authentication based on part of the calculation result transmitted between the first communication device and the second communication device; and performing a second authentication based on another part of the calculation result transmitted between the first communication device and the second communication device, and the second authentication is performed in association with the detection process.

The invention claimed is:

1. An authentication system, comprising:
   an authenticator that performs an authentication process between a first communication device and a second communication device when the first communication device and the second communication device communicate,
   wherein the authenticator performs the authentication process by transmitting authentication information from one of the first communication device and the second communication device to the other one of the first communication device and the second communication device, calculating the authentication information with an encryption code in each of the first communication device and the second communication device, and evaluating a calculation result, and
   during a processing series in the authentication process:
   the authenticator calculates the authentication information only once and divides the calculation result into at least two; and
   the authenticator performs a first authentication based on part of the calculation result transmitted between the first communication device and the second communication device, and a second authentication based on another part of the calculation result transmitted between the first communication device and the second communication device.

2. The authentication system according to claim 1,
   wherein the authenticator is arranged as a first authenticator,
   the authentication system further comprises a second authenticator,
   wherein when the first communication device and the second communication device communicate, the second authenticator performs a detection process detecting whether a usage situation of the first communication device and the second communication device is in accordance with a situation that would occur when used by a legitimate user, and
   during the processing series in the authentication process, the first authenticator performs the second authentication in association with the detection process.

3. The authentication system according to claim 2,
   wherein when the detection process is satisfactory, the first authenticator transmits at least part of the calculation result of the authentication process from one of the first communication device and the second communication device to the other one of the first communication device and the second communication device.

4. The authentication system according to claim 2,
   wherein during the processing series in the authentication process, the first authenticator evaluates the calculation result with both of the first communication device and the second communication device.

5. The authentication system according to claim 2,
   wherein the detection process performed by the second authenticator is distance detection that detects whether the first communication device and the second communication device are located within a certain distance of each other by performing a calculation on a distance measurement signal transmitted between the first communication device and the second communication device, and
   the first authenticator transmits the distance measurement signal including at least part of the calculation result.

6. The authentication system according to claim 2,
   wherein the first authenticator designates a position at which the calculation result is divided when transmitting a divided part of the calculation result.

7. The authentication system according to claim 2,
   wherein a process is executed multiple times in which the first authenticator transmits the authentication information from one of the first communication device and the second communication device to the other one of the first communication device and the second communication device, performs a calculation on the authentication information with the encryption code in each of the first communication device and the second communication device, and evaluates the calculation result.

8. The authentication system according to claim 2,
   wherein when the authentication process and the detection process are not satisfactory, the first authenticator retries the authentication process by transmitting new authentication information between the first communication device and the second communication device.

9. The authentication system according to claim 2,
   wherein the authentication process and the detection process use radio waves of different frequencies.

* * * * *